United States Patent [19]

Takagi

[11] Patent Number: 4,951,082
[45] Date of Patent: Aug. 21, 1990

[54] THREE-DIMENSIONAL MULTI-PATTERN PHOTO-METERING APPARATUS

[75] Inventor: Tadao Takagi, Yokohama, Japan

[73] Assignee: Nikon Corporation, Tokyo, Japan

[21] Appl. No.: 277,867

[22] Filed: Nov. 30, 1988

[30] Foreign Application Priority Data

Dec. 11, 1987 [JP] Japan .................................. 62-313190

[51] Int. Cl.⁵ .................................................. G03B 7/08
[52] U.S. Cl. ..................................... 354/432; 354/443
[58] Field of Search ............... 354/400, 412, 431, 432, 354/443

[56] References Cited

U.S. PATENT DOCUMENTS

| | | | |
|---|---|---|---|
| 4,412,730 | 11/1983 | Saegusa et al. | 354/31 |
| 4,754,299 | 6/1988 | Saegusa | 354/443 |
| 4,767,668 | 9/1988 | Ishikawa et al. | 354/443 |
| 4,821,074 | 4/1987 | Nakai et al. | 354/402 |

Primary Examiner—Russell E. Adams
Attorney, Agent, or Firm—Shapiro and Shapiro

[57] ABSTRACT

A three-dimensional multi-pattern photo-metering apparatus for photo-metering a plurality of areas into which a field is divided, comprises a photo-metering device for photo-metering the plurality of areas into which the field is divided and for producing a plurality of photometric outputs corresponding to brightness of the respective divided areas, an output device for outputting field information regarding at least one of an object distance, a focal length of a camera lens, a pupil position of the camera lens and a photographic time, a device for providing a plurality of discrete methods for producing reference information representative of the brightness of the areas in the field, and a device for selecting one of the plurality of methods on the basis of first and second discrete parameters regarding the photometric outputs and a third parameter regarding the field information and for producing the reference information in accordance with the selected method on the basis of the photometric outputs.

25 Claims, 5 Drawing Sheets

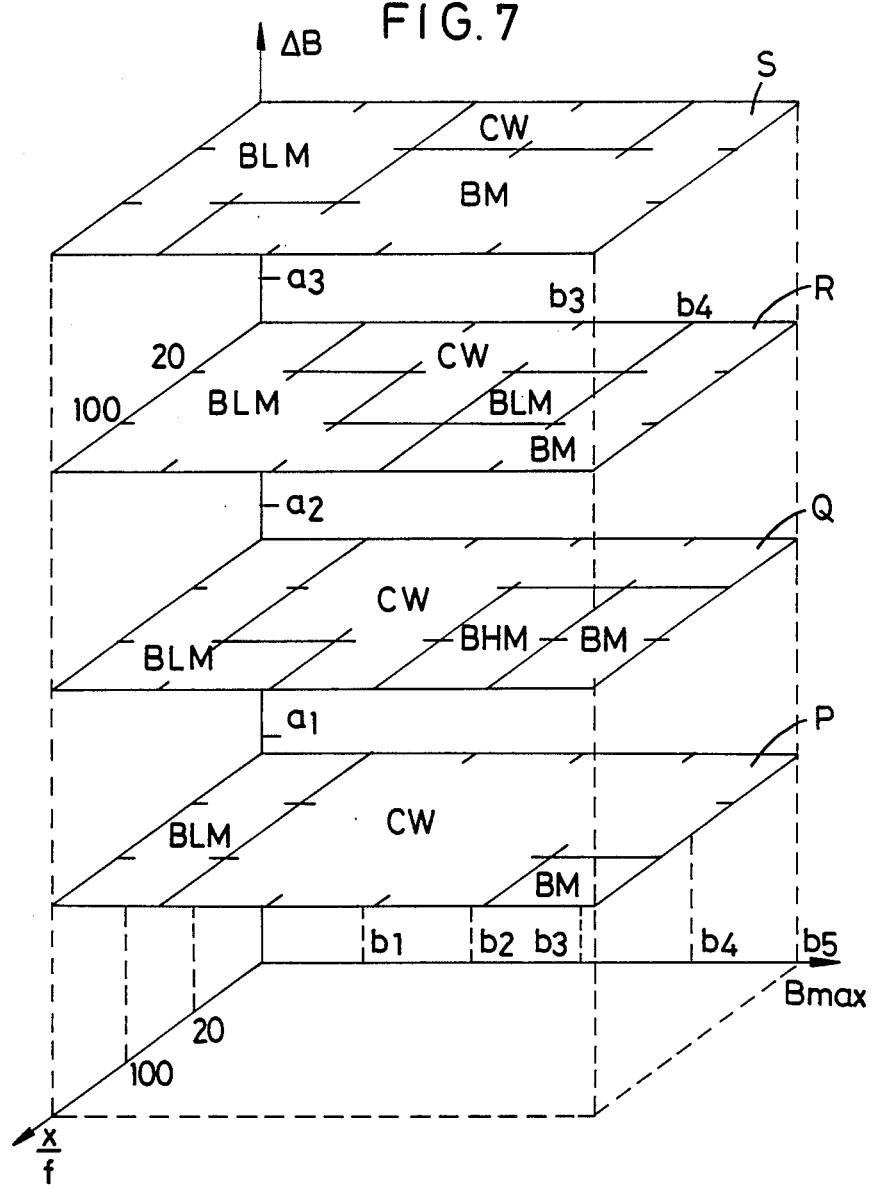

THREE-DIMENSIONAL MULTI-PATTERN PHOTO-METERING APPARATUS

BACKGROUND OF THE INVENTION

1. Field of the Invention

The present invention relates to a multiple photo-metering apparatus for obtaining a proper exposure value by photo-metering a plurality of areas in a field and by coordinating photometric results regarding the respective areas, and more particularly, it relates to a three-dimensional multi-pattern photo-metering apparatus adapted to select one of various exposure determining methods including e.g., a method wherein the photometric value regarding the central area of the field is weighted to determine the exposure value and a method wherein the exposure value is determined by an average value of the photometric values regarding all of the areas, and the like, in accordance with conditions of the field, in order to obtain a proper exposure value from the photometric values.

2. Description of the Related Background Art

In multi-pattern photo-metering apparatuses of this kind, as disclosed in the U.S. Pat. No. 4,412,730, an exposure determining method comprised of dividing the field into a central area and several peripheral areas surrounding the central area, photo-metering the respective areas and determining exposure information used for controlling the exposure, on the basis of the plural photometric values regarding the respective areas has been proposed.

In this conventional photo-metering apparatus, field luminance or brightness of each of the areas corresponding to plural photometric outputs is obtained, and a single exposure information is determined by utilizing several reference informations such as the obtained maximum brightness, minimum brightness, average brightness, maximum brightness difference, brightness regarding the central area and the like.

In order to determine such exposure information, several of the above-mentioned reference informations, for example, the maximum brightness and the maximum brightness difference are compared with a predetermined condition, respectively, thereby selecting a single exposure information calculated on the basis of the results of comparison regarding such reference information.

Now, in taking a photograph of an object, if the main object is a person, the exposure regarding the background is generally not so important, but the exposure regarding the person is regarded as important; whereas, if the object consists of a landscape, the balance of the whole landscape is regarded as important.

However, in the above-mentioned construction of the conventional apparatus, since the exposure information was determined on the basis of the same condition both when the main object is a person having an object distance of, for example, 3 meters and when the object is a landscape having an object distance ∞, it was not always possible to obtain an optimum exposure value with respect to various main objects.

SUMMARY OF THE INVENTION

An object of the present invention is to provide a three-dimensional multi-pattern photo-metering apparatus which can determine a more precise exposure value, in consideration of an information regarding the brightness, and an information other than said information regarding the brightness, for example, an information regarding the object distance or photographic time.

The photo-metering apparatus according to the present invention comprises a photo-metering means for photo-metering a plurality of areas into which a field is divided and for producing or generating a plurality of photometric outputs corresponding to brightness of the respective divided areas; an output means for outputting field information regarding modes of a field image in a screen, such as an object distance, an image magnification (a focal length of a lens), a photographic time or the like; a plurality of tables for storing, in discrete modes, a plurality of discrete calculation methods for producing a reference information representative of field brightness, in correspondence to any two parameters from among three parameters including first and second discrete parameters obtained by calculating the photometric values and a third parameter based on the field informations; a selection means for selecting any table from among the plurality of tables, on the basis of the third parameter; and a decision means for selecting one of the calculation methods from among the plurality of calculation methods from the table selected by the selection means and for determining the reference information on the basis of the selected calculation method.

According to the present invention, since the calculation method for producing the reference information is three-dimensionally selected from the first and second parameters regarding the brightness of the respective divided areas obtained by multi-pattern photo-metering the plurality of areas into which the field is divided and from the third parameter on the basis of the information regarding the mode of the field image in the screen, such as the object distance, the image magnification (the focal length of the lens) or the photographic time, for example, even if the photometric values of the respective areas when the object is a person are the same as those when the object is a landscape, the exposure information can be determined by discrete or different calculation methods, thereby obtaining the optimum exposure value for each of the objects.

Other objects, features and advantages of the present invention will become more apparent from the following detailed description when taken in conjunction with the accompanying drawings.

BRIEF DESCRIPTION OF THE DRAWINGS

FIG. 7 is an explanatory view showing four tables for determining a kind of reference informations, according to a second embodiment of the present invention.

DESCRIPTION OF THE PREFERRED EMBODIMENTS

Figure 1:
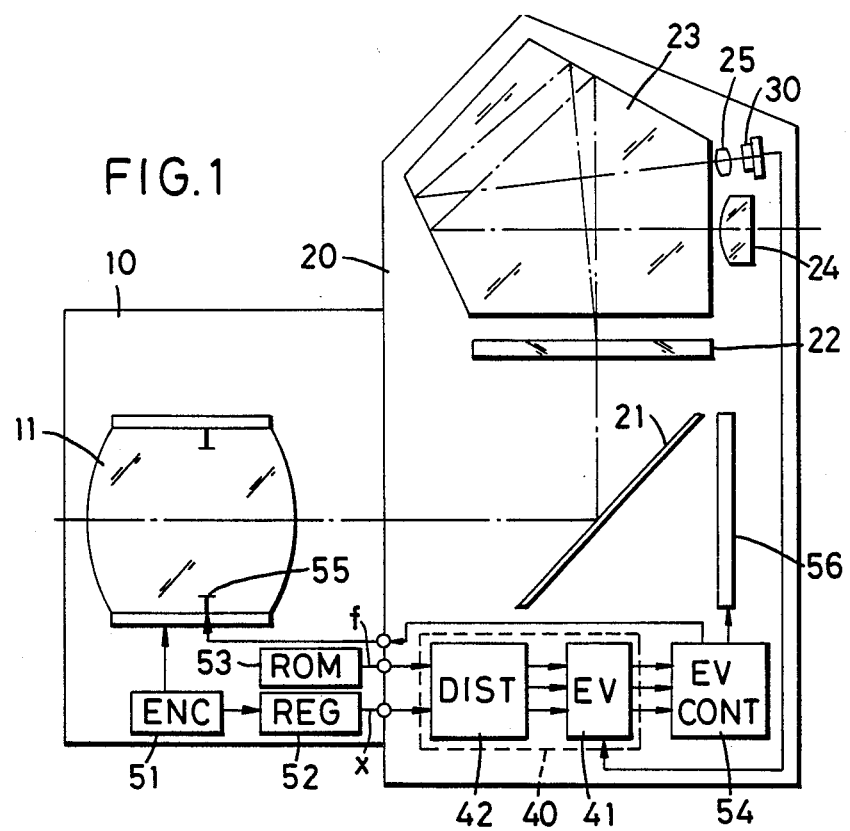
FIG. 1 a schematic side view of a single lens reflex camera incorporating therein a multi-pattern photo-metering apparatus according to a preferred embodiment of the present invention.

FIG. 1 is a diagrammatic view of a single lens reflex camera incorporating a multi-pattern photo-metering apparatus according to the present invention. A beam from a field passing through a camera lens 11 mounted within a camera lens assembly 10 is reflected by a main mirror 21 arranged in a camera body 20 and is diffused by a focusing screen 22 and then reaches a pentagonal roof prism 23. A part of the diffused beam passed through the pentagonal roof prism 23 is directed to an eyepiece 24, whereas another portion of the beam passed through the pentagonal roof prism passes through a condensing lens 25 and is directed to a photo-metering portion 30, where an object image formed on the focusing screen 22 is focused again.

Figure 2:
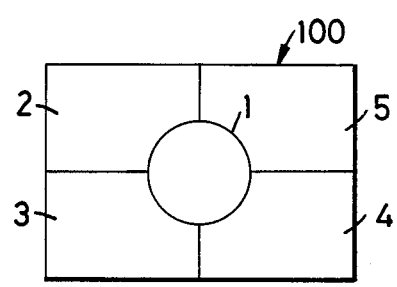
FIG. 2 is a plan view of a field to be divided for photo-metering the plural areas thereof separately.
Figure 3:
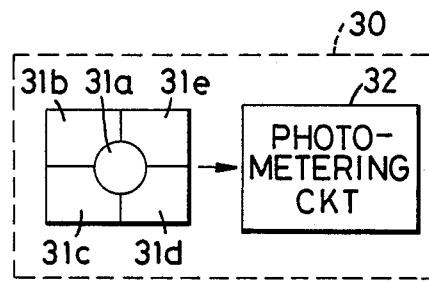
FIG. 3 is a plan view of the multi-pattern photo-metering portion divided into five sections.

The photo-metering portion 30 is adapted for photo-metering a field 100 in sections, as five divided areas 1-5, as shown in FIG. 2, and comprises five light acceptance elements 31a-31e corresponding to the respective areas 1-5, and a photo-metering circuit 32 for producing photometric outputs corresponding to brightness B1-B5 of the respective areas 1-5 on the basis of photometric values from the respective light acceptance elements 31a-31e, as shown in FIG. 3.

A control circuit 40 (FIG. 1) includes a distance information producing portion 42, and an exposure determining portion 41 which receives each of the photometric outputs from the photo-metering circuit 32.

An encoder 51 detects an object distance x from the position of the camera lens 11, and data of the detected object distance x is stored in a register 52. The camera lens assembly 10 further includes a ROM 53 in which data regarding a focal length f of the camera lens 11 and the like are stored. These data regarding the object distance x and the focal length f are both inputted to the distance information producing portion 42. The distance information producing portion 42 calculates a ratio x/f between the object distance x and the focal length f as a distance information and outputs the calculated result to the exposure determining portion 41. The exposure determining portion 41 determines an exposure value on the basis of the inputted distance information x/f and the photometric outputs, in accordance with a sequence which will be explained later. An exposure control portion 54 controls an aperture or diaphragm 55 and a shutter 56 in response to the determined exposure value.

Now, several determining methods for determining one exposure information on the basis of the photometric results regarding the plural areas in the field will be explained.

In the first method, a reference information CW is produced on the basis of the brightness B1 of the central area among the five divided areas in the field and the exposure information is determined on the basis of this reference information.

In the second method, a reference information BM is produced on the basis of an average brightness of the five areas and the exposure information is determined on the basis of this reference information BM.

In the third method, a reference information BLM is produced by weighting low brightness Bmin of five areas and the exposure information is determined on the basis of this reference information BLM.

In the fourth method, a reference information BHM is produced by weighting high brightness Bmax of the five areas and the exposure information is determined on the basis of this reference information BHM.

Thus, these reference informations CW, BM, BLM and BHM are represented by the following equations, respectively:

$$CW = B_1 \tag{1}$$

$$BM = \frac{B_1 + B_2 + B_3 + B_4 + B_5}{5} \tag{2}$$

$$BLM = \frac{BM + Bmin}{2} \tag{3}$$

$$BHM = \frac{BM + Bmax}{2} \tag{4}$$

Figure 4:
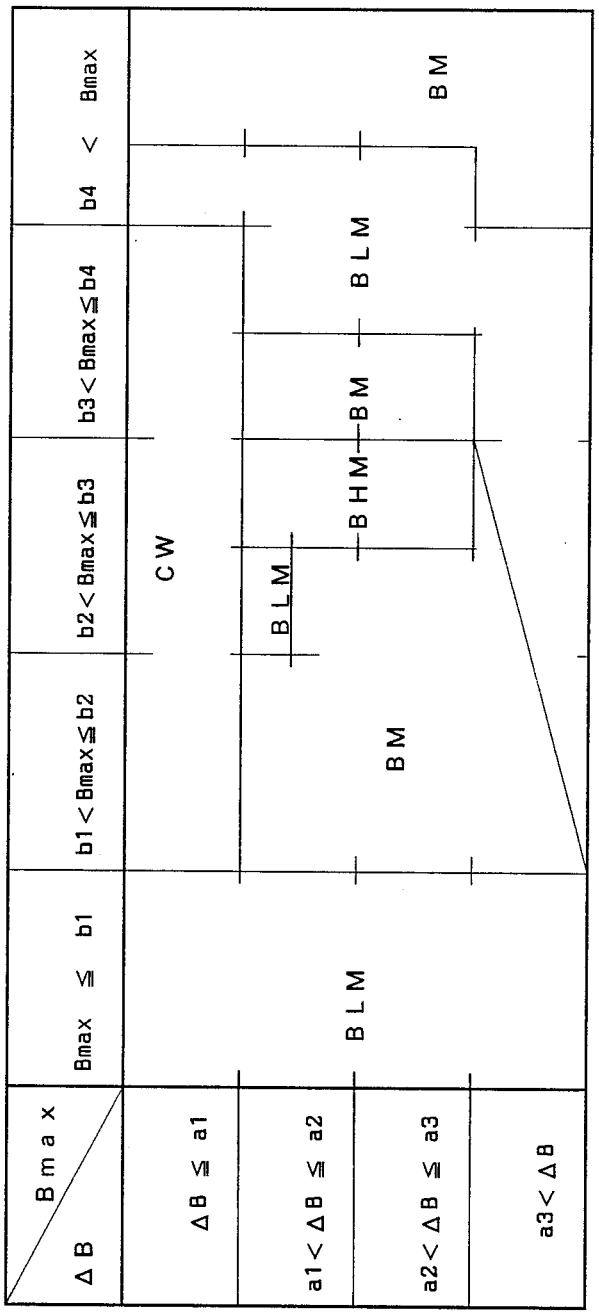
FIG. 4 is an explanatory view showing tables for determining a kind of reference information.

FIG. 4 conceptually shows a table for selecting the reference informations (and their calculation algorithms or methods). In this table, the maximum brightness Bmax among the brightness B1 regarding the central area of the field and the brightness B2-B5 regarding the peripheral areas is stipulated in an abscissa and a maximum brightness difference $\Delta B$ corresponding to the difference between the maximum brightness Bmax and the minimum brightness Bmin is stipulated in an ordinate. Any one reference information can be selected from among the above-mentioned four reference information on the basis of the values of Bmax and $\Delta B$.

For example, if the maximum brightness is in the range of $b3 < Bmax \leq b4$ and the maximum brightness difference is in the range of $a3 < \Delta B$, "BLM" is selected from the table, and the reference information BLM is calculated by weighting the minimum brightness on the basis of the above equation (3). The exposure value is determined by the calculated reference information, and the shutter and the diaphragm are controlled on the basis of the determined exposure value to prepare the photographic operation. In the table shown in FIG. 4, each of b1-b4 is a predetermined constant regarding the maximum brightness and each of a1-a3 is a predetermined constant regarding the maximum brightness difference.

Figure 5:
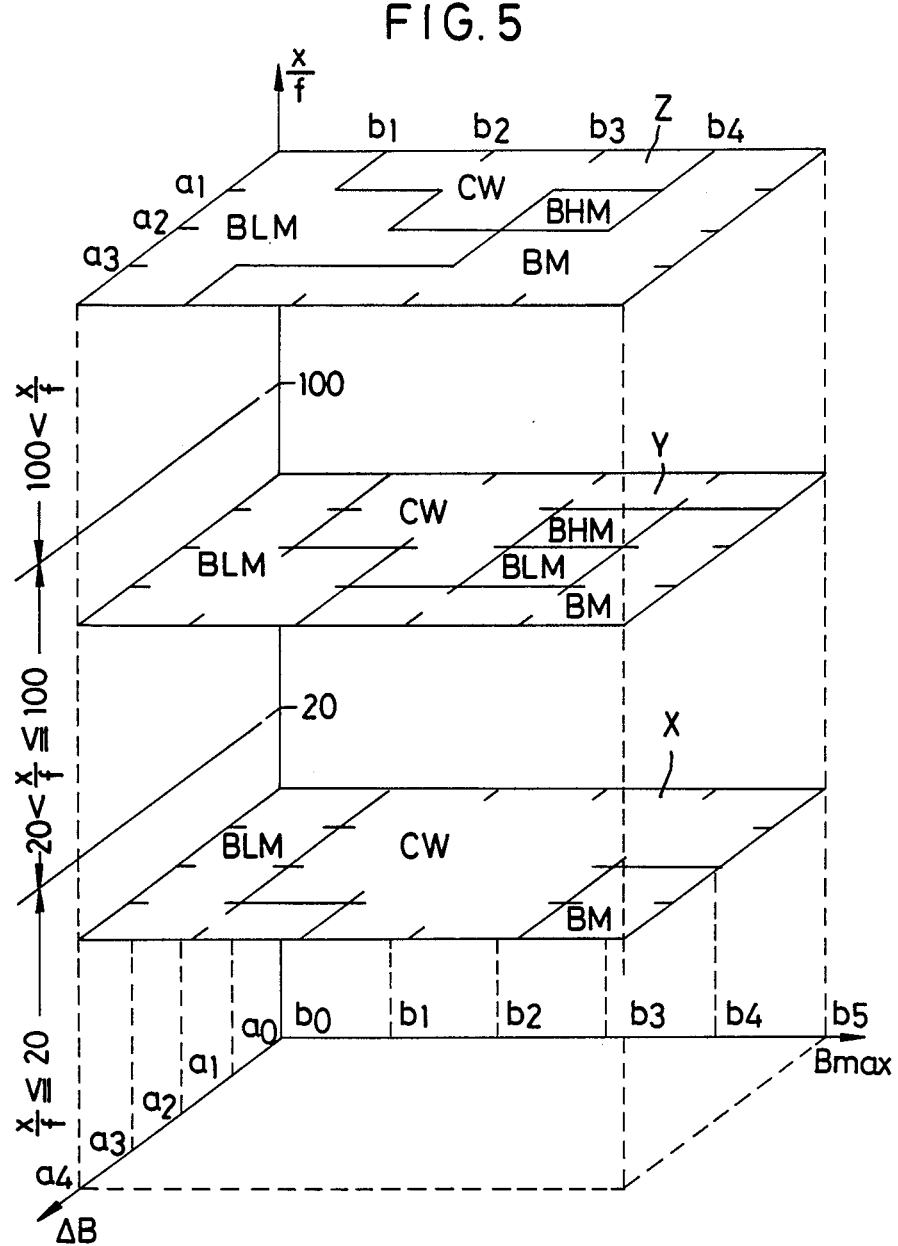
FIG. 5 is an explanatory view showing three tables for determining a kind of reference informations, according to a first embodiment of the present invention.

The exposure determining portion 41 includes a table means for selecting one of the above-mentioned exposure information determining methods, which table means comprises, as shown in FIG. 5, three tables each storing such exposure information determining methods in different modes. For example, each of the tables is constituted to select one reference information from among the afore-mentioned reference informations CW, BM, BLM and BHM on the basis of the three parameters, i.e., the maximum brightness Bmax, the maximum brightness difference $\Delta B$ and the above ratio x/f. In the illustrated embodiment, the parameter x/f regarding the distance is grouped into the following three ranges:

$x/f \leq 20$, $20 < x/f \leq 100$, and $100 < x/f$

And the tables X, Y and Z are prepared for each of such ranges, respectively.

Next, the sequence for determining the exposure value effected by the control unit 40 will be explained with reference to the flow chart shown in FIG. 6.

Figure 6:
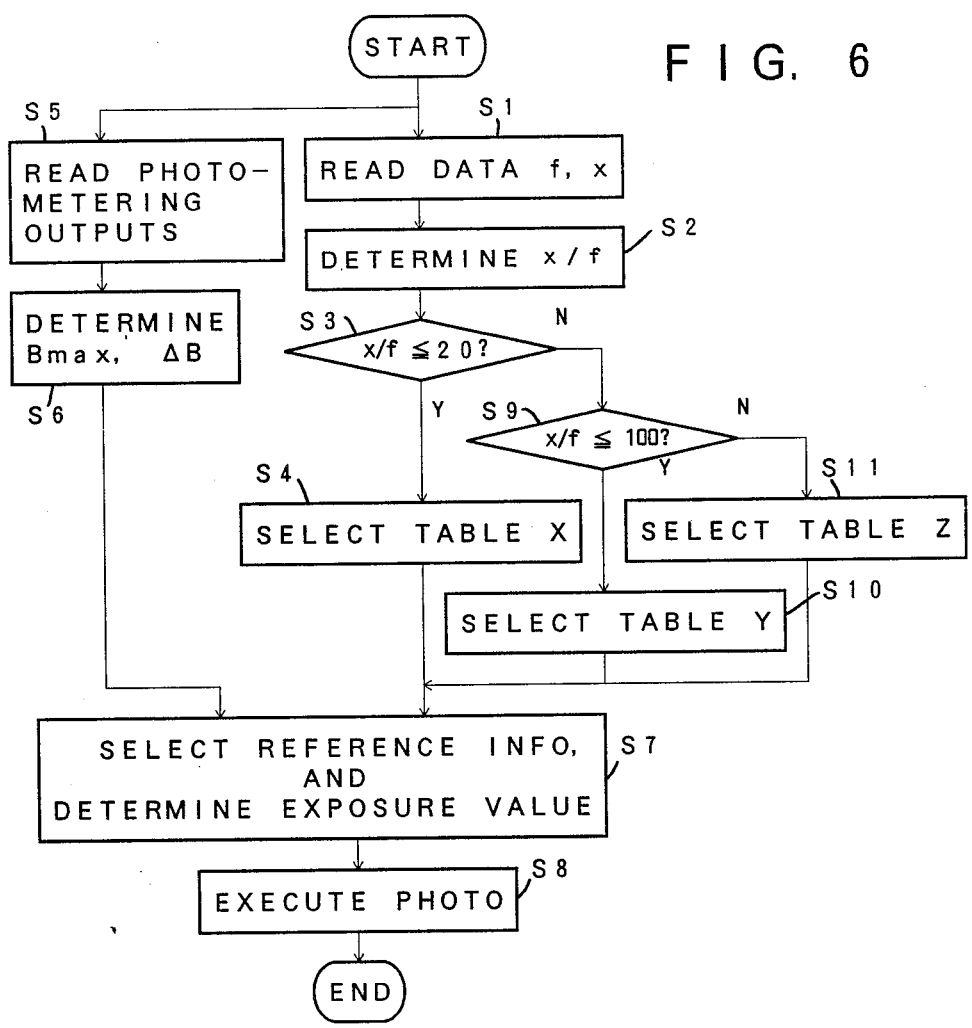
FIG. 6 is a flow chart explaining a sequence for an exposure operation, according to a first embodiment of the present invention.

In FIG. 6, first of all, in a step S1, the distance information producing portion 42 reads the data regarding the inherent focal length f of the lens stored in the ROM 53 of the lens assembly and the object distance x detected by the encoder 51. Then, in a step S2, the ratio x/f between the object distance and the focal length is determined by the distance information producing portion 42, and then in a step S3 the distance information producing portion 42 further judges whether the ratio x/f is equal to or smaller than twenty (x/f≦20) or not. If yes (Y), the sequence goes to a step S4, where the table X is selected from among the tables X, Y, Z (FIG. 5) by the exposure determining portion 41.

For example, if the focal length f of the camera lens is 50 mm, when the object distance x is in the range of x≦1000 mm (=1 m), i.e., when taking a photograph of the object positioned near the camera, the table X will be selected. Accordingly, the table X includes more reference information CW in which the central portion of the field is regarded as important) than those in the other tables Y and Z.

At the same time when the data is read in the step S1, the exposure determining portion 41 reads the photometric outputs from the photo-metering circuit 32 in a step S5. Then, the exposure determining portion 41 determines the maximum brightness Bmax and the maximum brightness difference ΔB in a step S6.

Further, in a step S7, the exposure determining portion 41 selects the reference information from the table X on the basis of the values Bmax and ΔB determined in the step S6 and determines the exposure value on the basis of such reference information. Next, in a step S8, the exposure control portion 54 drives the diaphragm 55 and the shutter 56 on the basis of the determined exposure value and executes the photograph.

On the other hand, if no (N) is given in the step S3, the sequence goes to a step S9, where the distance information producing portion 42 judges whether the ratio x/f is equal to or smaller than 100 (x/f≦100) or not. If yes, the sequence goes to a step S10, where the table Y is selected from among the tables X-Z shown in FIG. 5. Then, the operation in the step S7 is performed on the basis of the results of the Steps S5 and S6.

If the focal length f of the camera lens is 50 mm as described above, when the object distance x is in the range of 1 m)(x≦5 m, i.e., when the photograph of a person is executed as a main object, the table Y will be selected. Accordingly, the table Y includes more reference information CW weighting the central portion of the field and more reference information BLM weighting the low brightness than those in the other tables.

If no (N) is given in the step S9, the sequence goes to a step S11, where the table Z is selected. Here, it is assumed that the focal length f is 50 mm, u when the object distance x is larger than 5 m (x>5 m), no is given in the step S9. This object distance mainly indicates that, for example, a photograph regarding a landscape is to be executed. Accordingly, the table Z includes more reference information BM based on the average value of the brightness of the divided areas in the field. When the table Z is selected, similarly to the above, the sequence goes to the step S7 on the basis of the results of the steps S5 and S6, and then goes to the step S8, where the photograph is executed.

Next, an example of the exposure value determining process will be explained by adopting actual exemplary numerical values.

It is assumed that the brightness B1-B5 represented by the photometric outputs are 13.1 (=B1), 10.5 (=B2), 12.0 (=B3), 13.5 (=B4) and 14.0 (=B5), respectively (unit: EV(ASA/ISO 100), the focal length f of the camera lens 11 is 50 mm and the object distance x is 50 m.

In this case, since the ratio x/f is 1000 (x/f=50×10³ mm/50 mm=1000), according to the above-mentioned sequence, no is given in the step S9, thus selecting the table Z.

Further, the maximum brightness is stipulated by:

$$Bmax = b5 = 14.0,$$

and the maximum brightness difference is stipulated by:

$$\Delta B = B5 - B2 = 14.0 - 10.5 = 3.5.$$

Here, in FIG. 5, if the constants b3, b4, a2 and a3 are in the ranges stipulated by:

$$b3 < 14 < b4, \quad a2 < 3.5 < a3,$$

the exposure determining method utilizing the reference information BM based on the average value is selected in the table Z, and the reference information BM is calculated as the following:

$$BM = \frac{13.1 + 10.5 + 12.0 + 13.5 + 14.0}{5} = 12.6,$$

and the exposure value is determined on the basis of the calculated reference information BM.

In accordance with the afore-mentioned process, since the reference information used for determining the exposure value is selected on the basis of the maximum brightness Bmax, maximum brightness difference ΔB and the distance information x/f, for example, when the main object is a person the photograph can be executed with the exposure matched with the person, and, when the main object is a landscape the photograph can be executed with the exposure balanced as a whole.

In place of the above-mentioned tables shown in FIG. 5 each having a two-dimensional plane defined by the abscissa and ordinate both regarding the brightness informations (Bmax, ΔB), for example, as shown in FIG. 7, a table means including four tables S, R, Q and P each having a two-dimensional plane defined by the maximum brightness Bmax (abscissa) and the distance information x/f (ordinate) and including a third (vertical) axis representing the maximum brightness difference ΔB to select the tables may be used.

In the embodiments mentioned above, while a single lens reflex camera of lens changeable type having TTL photo-metering apparatus was explained, it should be noted that the present invention is applicable to a camera of lens shutter type having a direct view finder. Further, the present invention can be applied to a camera having a zoom lens assembly, wherein the focal length of the camera lens can be changed. In this case, a zoom encoder may be provided for detecting the focal length f. Further, the number of the tables is not limited to three (as X, Y and Z), but a desired number of tables can be prepared as needed.

In addition, in place of the parameter x/f used in the illustrated embodiment, a parameter $x^n/f$ (n≠1) can be used. Further, as the parameter for selecting the tables, the focal length f may merely be used, or the ratio x/f or a projecting pupil distance Po may also be used, or, for example, when the focal length is constant as in the case of a camera having a single focal length lens shutter and the like, the object distance x may be merely used. Furthermore, when a clock is incorporated into the camera, as the parameter for selecting the tables, in place of the distance information such as the object distance x or the focal length f, a photographic time t may be used for conforming to the change in the exposure value due to difference in color of illumination light between the daylight, and morning and evening.

Further, while the present invention was explained in connection with the exposure information determining method selected on the basis of the maximum brightness Bmax and the maximum brightness difference $\Delta B$ or the distance information x/f, it should be noted that the present invention is not limited to this. For example, such method may be selected on the basis of the average value BM and the maximum brightness difference $\Delta B$. In addition, in the illustrated embodiments, while an example in which the field is divided into five areas to be photo-metered was explained, the invention is not limited to such division; for example, the field may be divided into four areas or less, or into six areas or more. Further, as to the TTL photo-metering method, an example in which the photo-metering portion receives a portion of the beam diffused by the focusing screen for photo-metering the same was explained, but the present invention can be applied to, for example, a camera adopting a photo-metering method wherein the photo-metering portion receives a portion of the beam diffused by a shutter blind.

What is claimed is:

1. A photo-metering apparatus for a camera, comprising:
    photo-metering means for photo-metering a plurality of areas into which a field is divided and for producing a plurality of photometric outputs corresponding to brightness of the respective divided areas;
    means for producing first and second parameters relating to brightness of said areas in accordance with said plurality of photometric outputs;
    means for producing a third parameter regarding a ratio between a focal length of a camera lens and an object distance;
    means for providing a plurality of different tables of reference information, each table including different reference information relating to brightness of said areas and determined by different algorithms respectively;
    means for selecting one of said plurality of tables in accordance with one of said first, second, and third parameters; and
    means for selecting reference information from the selected table in accordance with the others of said parameters jointly.

2. A photo-metering apparatus according to claim 1, wherein said first parameter corresponds to maximum brightness of said areas.

3. A photo-metering apparatus according to claim 1, wherein said second parameter corresponds to a difference between maximum brightness and minimum brightness of said areas.

4. A photo-metering apparatus according to claim 1, wherein said different reference information includes reference information relating to brightness of a central area of said field, reference information relating to average brightness of said areas, reference information relating to minimum brightness of said areas, and reference information relating to maximum brightness of said areas.

5. A photo-metering apparatus according to claim 1, wherein the reference information selected by said means for selecting reference information is dependent upon whether values of the others of said parameters are within predetermined ranges of values.

6. A photo-metering apparatus according to claim 1, wherein said one parameter is said third parameter.

7. A photo-metering apparatus according to claim 1, wherein said one parameter is one of said first and second parameters.

8. A photo-metering apparatus according to claim 1, further comprising means responsive to the selected reference information for determining an exposure value for photographing an object in said field.

9. A photo-metering apparatus for a camera, comprising;
    photo-metering means for photo-metering a plurality of areas into which a field is divided and for producing a plurality of photometric outputs corresponding to brightness of the respective divided areas;
    means for producing first and second parameters relating to brightness of said areas in accordance with said plurality of photometric outputs;
    means for producing a third parameter in accordance with one of a focal length of a camera lens, a projecting pupil distance of a camera lens, an object distance, and time of day;
    means for providing a plurality of different tables of reference information, each table including different reference information relating to brightness of said areas and determined by different algorithms, respectively;
    means for selecting one of said plurality of tables in accordance with one of said first, second, and third parameters; and
    means for selecting reference information from the selected table in accordance with the others of said parameters jointly.

10. A photo-metering apparatus according to claim 9 wherein said first parameter corresponds to maximum brightness of said areas.

11. A photo-metering apparatus according to claim 9, wherein said second parameter corresponds to a difference between maximum brightness and minimum brightness of said areas.

12. A photo-metering apparatus according to claim 9, wherein said different reference information includes reference information relating to brightness of a central area of said field, reference information relating to average brightness of said areas, reference information relating to minimum brightness of said areas, and reference information relating to maximum brightness of said areas.

13. A photo-metering apparatus according to claim 9, wherein the reference information selected by said means for selecting reference information is dependent upon whether values of the others of said parameters are within predetermined ranges of values.

14. A photo-metering apparatus according to claim 9, wherein said one parameter is said third parameter.

15. A photo-metering apparatus according to claim 9, wherein said one parameter is one of said first and second parameters.

16. A photo-metering apparatus according to claim 9, further comprising means responsive to the selected reference information for determining an exposure value for photographing an object in said field.

17. A photo-metering apparatus for a camera, comprising:
   photo-metering means for photo-metering a plurality of areas into which a field is divided and for producing a plurality of photometric outputs corresponding to brightness of the respective divided areas;
   means for producing first, second, and third parameters, said first and second parameters relating to brightness of said areas in accordance with said plurality of photometric outputs, said third parameter relating to photographic information other than brightness of said areas;
   means for providing a plurality of different collections of reference information, each collection including different reference information relating to brightness of said areas and determined by different algorithms, respectively;
   means for selecting one of said plurality of tables in accordance with one of said first, second, and third parameters;
   means for selecting reference information from the selected collection in accordance with the others of said parameters jointly; and
   means responsive to the selected reference information for determining an exposure value for photographing an object in said field.

18. A photo-metering apparatus according to claim 17, wherein said first parameter corresponds to maximum brightness of said areas.

19. A photo-metering apparatus according to claim 17, wherein said second parameter corresponds to a difference between maximum brightness and minimum brightness of said areas.

20. A photo-metering apparatus according to claim 17, wherein the selection of reference information by said selecting means is dependent upon whether values of said first and second parameters are within predetermined ranges of values.

21. A photo-metering apparatus according to claim 17, wherein said different reference information includes reference information relating to brightness of a central area of said field, reference information relating to average brightness of said areas, reference information relating to minimum brightness of said areas, and reference information relating to maximum brightness of said areas.

22. A photo-metering apparatus according to claim 17, wherein said one parameter is said third parameter.

23. A photo-metering apparatus according to claim 17, wherein said one parameter is one of said first and second parameters.

24. A photo-metering apparatus according to claim 17, wherein said third parameter relates to information regarding the object distance or time of photography.

25. A photo-metering apparatus according to claim 17, wherein the collection selected by said means for selecting one of said plurality of collections is dependent on whether the value of said one parameter is within predetermined ranges of values.

* * * * *